Feb. 22, 1927. H. A. EDWARDS Re. 16,553
CONE WINDING MANDREL
Original Filed Feb. 3, 1925 2 Sheets-Sheet 1
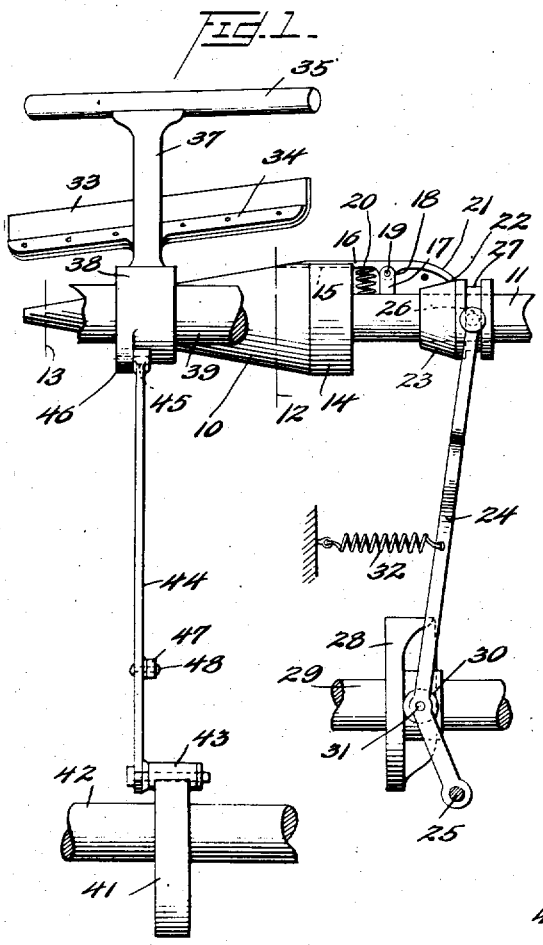
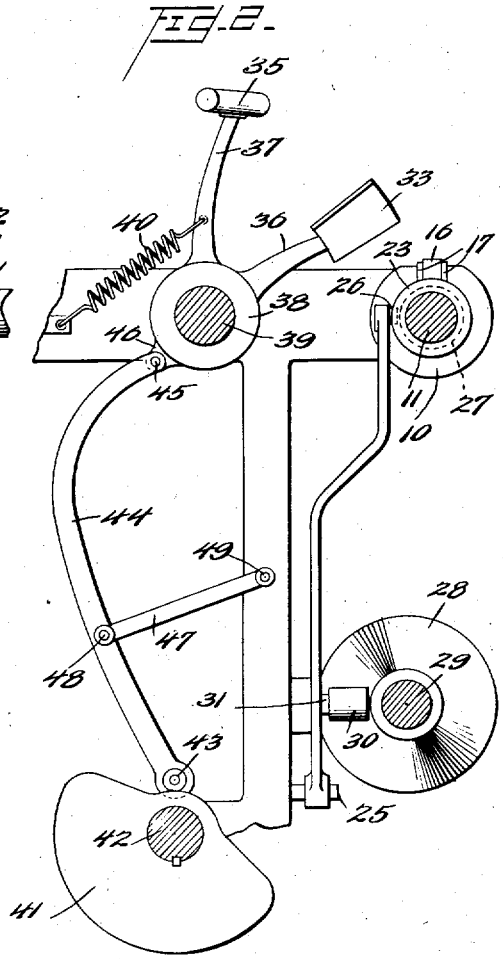
Inventor
Howard A. Edwards,
By Watson, Coit, Morse & Grindle,
Attorney Feb. 22, 1927. Re. 16,553

H. A. EDWARDS

CONE WINDING MANDREL

Original Filed Feb. 3, 1925 2 Sheets-Sheet 2

Inventor

Howard A. Edwards,

By Watson, Cole, Morse & Grindle,

Attorney

Reissued Feb. 22, 1927.

Re. 16,553

UNITED STATES PATENT OFFICE.

HOWARD A. EDWARDS, OF CEDARTOWN, GEORGIA, ASSIGNOR TO SONOCO PRODUCTS COMPANY, OF HARTSVILLE, SOUTH CAROLINA, A CORPORATION OF SOUTH CAROLINA.

CONE-WINDING MANDREL.

Original No. 1,587,222, dated June 1, 1926, Serial No. 6,636, filed February 3, 1925. Application for reissue filed October 21, 1926. Serial No. 143,284.

This invention relates to cone winding mandrels and more particularly to a means for gripping a blank and securing it to the mandrel, before and during the winding process, at a point outside of the lines of contact of the cutting knives in order that the waste ends of the cone may be completely severed from the useful center portion while the cone is still in position on the mandrel, and still allow the use of a feather edge on the inside of the cone.

In the accompanying drawing and following specification there is disclosed by way of example, only, a single illustrative embodiment of the present invention, but it is to be understood, however, that various changes can be made therein by those skilled in the art in the form, arrangement, proportions, size and material of the various parts shown without departing from the spirit of the invention or the scope of the appended claims.

In said drawing:—

Fig. 1 is a side elevation of a cone winding mandrel constructed according to the present invention and showing the associated parts;

Fig. 2 is an end elevation looking from the right to Figure 1, the shafts being shown in section;

Figure 3:
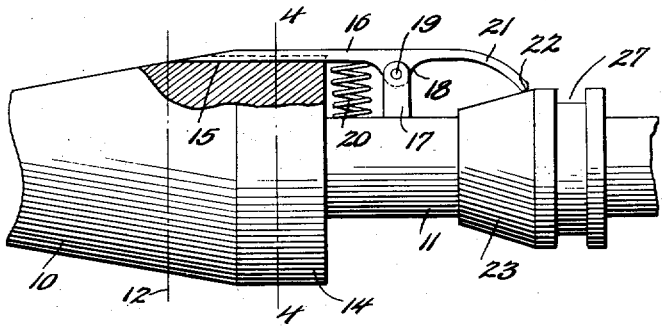
Fig. 3 is a partial side elevation of the mandrel on a larger scale showing the blank clamping mechanism, certain parts being broken away.
Figure 4:
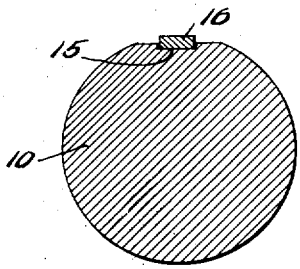
Fig. 4 is a transverse section on line 4—4 of Figure 3.

In winding cones and more particularly paper cones for use in the textile industries, it is important that the size and shape of the cones be quite exact and it is highly desirable that both the inner and outer ends of the blank shall have a feather edge so that the finished cone may fit more securely upon the spindle and have a smooth outer surface for winding.

Heretofore numerous methods have been suggested for securing the inner end of the blank to the cone winding mandrel to hold it during winding, but in most cases it has then been impossible to completely sever the waste ends from the cone while it is still on the mandrel owing to the fact that the gripped portion is held below the surface of the mandrel and thus out of the path of the trimming knives. These proposed forms of blank securing means do not allow the satisfactory use of a feather edge blank for the inner lap of the cone, nor do they allow the inner end to be gummed to the cone. The present invention proposes to overcome the above difficulties by providing a clamping means to secure the blank at a point without the useful portion thereof in order that a feather edge blank may be used and completely trimmed on the mandrel.

Referring to the drawings, there is disclosed at 10 a conical mandrel which may be formed solid or hollow as desired and of any suitable material. It is mounted upon the end of a shaft 11 coaxial therewith which is supported in suitable bearings, not shown, for rotation by any desired source of power. Between the lines 12 and 13, which define the useful limits of the finished cone and upon which lines the cone is trimmed by any of the well known forms of circular knives which are pressed against it at the completion of its winding, the surface of the mandrel is a true cone. It may extend some distance beyond the line 13 and does extend a distance beyond the line 12. Preferably it is cylindrical as at 14. This cylindrical portion and a part of the conical portion without the line 12, is provided with a longitudinal groove or channel 15 of any desired cross section adapted to receive therein a clamping finger 16 which is flush with or below the surface of the mandrel when pressed into the groove as later described.

This clamping finger 16 comprises a strip of metal shaped in cross section to fit the groove and having a width but slightly less than the width of channel 15 and of sufficient thickness to give it considerable strength. It is pivoted intermediate its ends to the bracket 17 secured rigidly to the shaft 11 and extending radially therefrom. This bracket 17 is longitudinally slotted to receive between its furcations the downward projecting boss 18 on the finger 16, a pivot pin 19 being passed through these furcations and the boss to secure the finger 16 for rotation into and out of the channel 15. The finger 16 is normally retained in a position out of the channel 15 by means of the coil spring 20 interposed between the shaft 11 and the under side of the finger between the bracket 17 and the end of the mandrel. Suitable studs may be provided on the shaft and the under surface of the finger over which the coil spring slips to retain it in position. The right hand end of the finger 16 is downwardly curved as shown at 21, so that its end 22 may ride upon the conical end of the finger-actuating collar 23 which is slidably and rotatably mounted on the shaft 11.

The finger-actuating collar 23 is adapted to be moved longitudinally throughout a limited distance along the shaft 11 by suitable mechanism so that when moved to its extreme left hand position it forces the left hand end of the finger 16 tightly into the channel 15 but when moved to its righthand position allows the finger 16 to be raised out of the channel under the action of the spring 20.

The finger-actuating collar is controlled in its movement by the arm 24 pivoted at 25 to any suitable portion of the frame of the winding machine and having the stud 26 which if desired may carry a roller so positioned as to fit within and engage the side walls of the channel 27 in the cylindrical end of the finger-actuating collar so that movement of the arm 24 will be transmitted to and move the collar in a corresponding direction. The movements of the arm 24 are controlled by a face cam 28 mounted upon the shaft 29 and driven by any suitable connection, from the shaft 11. The cam 28 bears upon a cam follower 30 which may be a roller mounted upon a stud 31 projecting from the arm 24 so that when the high surface on the face of the cam engages this follower, the finger-actuating collar will be withdrawn from beneath the end 22 of the finger and allow it to be lifted out of the channel by the spring 20. A coil spring 32 serves to draw the arm 24 toward the left and thus press the finger 10 tightly into the channel 15 at such times as the cam follower does not contact with the elevated portion of the cam 28.

When the device is being operated, a suitable blank of paper coated with the usual adhesive is brought either by hand or by a carriage as is well known in the art, to the surface of the mandrel while stationary and the cam 28 is in such a position as to allow the finger 16 to be lifted out of its channel. The end of the blank is then pushed beneath the finger and before rotation of the shaft 11 commences, the cam follower 30 is released by the elevated portion of the cam 28 and the spring 32 draws the arm 24 and with it the collar 23 to the left, thus pressing the finger 16 down into the channel and securely clamping the blank to the mandrel so that it cannot move either longitudinally or circumferentially of the mandrel, or be twisted in respect thereto.

It is necessary that the inner edge of the blank which is preferably feathered, be securely pressed down and held against the surface of the mandrel before winding commences, so that the second layer of the blank will fit tightly against the first layer and the first layer will be securely pressed against the mandrel, to form a cone in which the various layers adhere to each other throughout their total area. As previously mentioned, the blank is covered with adhesive material and in order that its inner edge may be pressed down so that the adhesive will hold it against the mandrel, there is provided the wiper 33 formed of any suitable flexible material such as rubber, leather or cloth having a reinforcing metal backing 34. This wiper is passed downward against the feather edge and presses it into engagement with the mandrel to which it sticks. The wiper passes on by the mandrel to a position beneath it, at which time rotation of the mandrel commences. The slicker 35 is then brought into engagement with the surface of the blank to securely press it against the mandrel to cause it to be tightly wrapped. The slicker remains in contact with the blank until the completion of the wrapping and causes the outside feather edge to adhere to the previous layer. This slicker comprises a bar or rod formed of any suitable material such as metal and of any desired cross section.

Both the wiper 33 and the slicker 35 are of sufficient length and so positioned as to contact throughout its full length with the blank when it is in position on the mandrel. They are mounted respectively on a pair of arms 36 and 37 radiating from the hub 38 which is rotatably mounted upon the shaft 39 securely fixed to the frame of the machine. The hub 38 and the arms carried thereby, are retained in a retracted position, such as shown in Figure 2, by means of the coil spring 40.

Movement of the hub 38 to first cause the wiper to pass over the surface of the mandrel and the slicker to then engage the surface of the blank, is caused by the cam 41 mounted upon the shaft 42 which may be driven by suitable mechanism so as to be properly timed in respect to shaft 11. A cam follower 43 is mounted upon the lower end of a curved actuating arm 44 which is pivoted at 45 to a projection 46 on the hub 38. A link 47 is pivoted to the actuating arm 44 at 48 and to the frame of the machine at 49 to restrain the lower end of the actuating arm 44 for movement in an arc about the pivot 49 so that the follower 43 will always remain in engagement with the cam 41. Since in its position of rest the arm 46 is to the left of the center of the shaft 39, it will be seen that when the follower 43 rides upon the elevated portion of the cam 41 that upward movement of the actuating arm 44 will produce clockwise rotation of the wiper and slicker, as viewed in Figure 2.

Reviewing, then, the operation of the device, it will be understood that with the shaft and mandrel 11 stationary, the finger-actuating collar 23 will be moved to the extreme right by the position of the cam 28. A blank of suitable paper, covered with adhesive, will then be brought to the surface of the mandrel with its end projecting beneath the finger 16 and its feather edge substantially parallel to the element of the cone-shaped mandrel with which it contacts. When so positioned the clamping finger 16 descends and grips the blank. At this time the cam follower 43 begins to ride up on the cam 41 so that the wiper, which faces in the same direction as the main portion of the blank, is brought down into engagement with the blank near its edge and by its continued movement wipes over the edge toward the feathered portion, wiping it down so that the adhesive thereon causes it to stick to the surface of the mandrel. The wiper then passes on to a position below the mandrel; rotation commences and the slicker 35 comes into engagement with the surface of the blank under the action of the cam 41, remaining in engagement until the blank is completely wound upon the mandrel and serves to hold it tightly in contact therewith and secure the outer feather edge down to the last turn. With the slicker still in engagement with the cone, the disk-shaped cutting knives, not shown, are moved into engagement with the cone on the lines 12 and 13 severing the ends from the useful center portion. The slicker and wiper are then returned under the action of the spring 40 to the position shown in Figure 2 and the cone stripped from the mandrel by any suitable well known mechanism, such as a stripper mounted on the carriage which brings up the next blank for winding.

Figure 5:
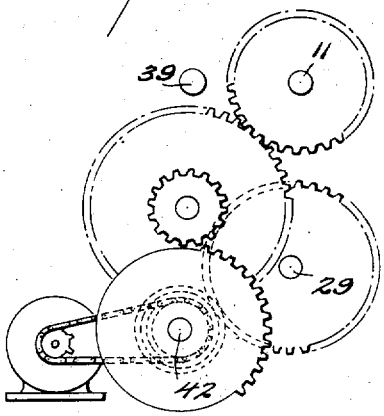
Fig. 5 is an end elevation showing only the driving means for the various shafts.

As an example of one method of driving the various shafts, reference should be had to Figure 5 wherein are shown the shafts in end elevation. An electric motor 50 is provided, which has a chain and sprocket connection with 42. On shaft 42 the cam 41, previously referred to, is mounted as is also the larger of two cooperating intermittent gears 51. The smaller intermittent gear 52 is mounted on an idler shaft, upon which shaft is also rigidly mounted the large gear 53, which in turn meshes with gear 54 mounted on mandrel shaft 11. Thus the mandrel shaft is intermittently rotated by power taken from the constantly rotating motor, through the gearing described, and the wiper and slicker are intermittently oscillated through the action of cam 41 and lever 44. A second gear 55 on shaft 42 meshing with a gear 56 on shaft 29 serves as a driving connection for the last mentioned shaft.

An important feature of this invention consists in the provision of means for securely clamping the blank to the mandrel at a point outside of the useful portion of the blank so that the complete trimming may be done while the cone is still in engagement with the mandrel, thus giving the knives a surface to work against and eliminating any additional operations of trimming after the cone is removed from the mandrel. The wiper is an important adjunct to this method of gripping the blank to the mandrel since it presses the feather edge into engagement with the mandrel and causes it to stick thereto during the starting of the winding. With this form of mechanism as described, an extremely satisfactory operation is obtained and perfect cones are made with a minimum number of rejects. The operation is simplified and cheapened, better cones are produced and a feather edge can be used both inside and outside, thus producing the best possible known form of cone.

It is obvious that the gripping finger can be arranged at either end of the cone, or if desired there may be one at each end, the method of operation of the finger being the same as that disclosed, or any other means may be used such as a concentric rod running through the mandrel and shaft 11 and having a projecting stud with an inclined face to act on the end 22 of the finger. This rod may be pressed in and out by a lever at the end of shaft 11 acting against a spring.

In its broadest aspect the invention is not limited to any particular gripping means for securing the blank to the mandrel, such as that form of gripping device which is shown and described by way of example. By the terms "gripping means" and "attaching means" as used in the appended claims is meant, therefore, any suitable means, of which there are a number well known in the art, for temporarily attaching the blank to the mandrel so that it is constrained to rotate with the mandrel. It is immaterial to the successful practice of the invention whether the blank securing means be mechanical, electrical or pneumatic in its nature, or whether it comprises a portion of the mandrel itself or a device separate therefrom but operatively associated therewith. The "wiping" means may also vary widely in its structure and mode of operation without departure from the spirit of the invention.

While the above description has been particularly directed to apparatus for winding paper cones, it is to be understood that no material changes would be necessary in order to make the apparatus function for winding cylinders of the type used in the textile trades. The word tube is to be considered in the following claims as generic and including both cylinders and cones.

Having thus described the invention, what is claimed as new and desired to be secured by Letters Patent is:—

1. In a device for winding paper tubes, in combination, a mandrel longer than a finished tube and means thereon for gripping a blank to be formed into a tube beyond the trimming line of said tube.

2. In a device for winding paper tubes, in combination, a mandrel longer than a finished tube and having a longitudinal groove therein outside of the position of a finished tube on said mandrel, a finger adapted to fit into said groove and clamp a blank securely to said mandrel and means to operate said finger.

3. In a device for winding paper tubes, in combination, a mandrel longer than a finished tube, means thereon to clamp a blank thereto, said means gripping said blank outside of the section of the mandrel adapted to hold the finished tube whereby the waste ends may be fully trimmed off while the tube is in position on said mandrel.

4. In a device for winding paper tubes, in combination, a rotatively mounted mandrel adapted to have a gummed blank wound thereon and trimmed at the ends, and gripping means on said mandrel adapted to clamp said blank thereto only outside of the useful portion thereof.

5. In a device for winding paper tubes, in combination, a rotatively mounted mandrel adapted to wind a gummed blank thereon and have said tube formed from said blank trimmed along peripheral lines near its ends and means to clamp said blank to said mandrel outside of the trimming lines, comprising a pivoted clamping finger adapted to fit into a slot in said mandrel and means to press said finger into said slot with the blank beneath it.

6. In a device for winding paper tubes from gummed blanks in combination, a rotatively mounted mandrel, means thereon to clamp said blank thereto only outside of the lines of the finished tube, means to wipe the inner edge of said blank against said mandrel to cause it to adhere thereto, a slicker to press said blank against said mandrel during winding and means to rotate said mandrel and bring said clamping and wiping means and said slicker into operation in the proper sequence.

7. In a device for winding paper tubes from gummed blanks having feather edges, in combination a rotatively mounted mandrel, means at one end thereof to clamp a blank thereto, means to wipe the inner feather edge of said blank into contact with said mandrel, means to rotate said mandrel to wind the blank thereon, a slicker adapted to be brought into contact with said blank to press it into contact with said mandrel during winding and means to operate said wiper and slicker for successive engagement with said blank.

8. In a device for winding paper tubes from gummed feather-edged blanks, in combination, a mandrel, means to intermittently rotate said mandrel, a clamping finger at one end of said mandrel to secure a blank thereto, a wiper adapted to pass from above to below said mandrel to wipe the inner edge of said blank to cause it to adhere to said mandrel before winding commences, a slicker adapted to press said blank into engagement with said mandrel during winding, and means driven from and timed by said mandrel driving means to operate said clamping finger, said wiper and said slicker.

9. In a device for winding paper tubes from gummed, feather-edged blanks, in combination, a mandrel having a longitudinal groove at one end thereof, a finger pivoted for movement into and out of said groove and adapted to clamp said blank to said mandrel, means to drive said mandrel intermittently, a wiper adapted to cause the edge of said blank to adhere to said mandrel after clamping by said finger and before rotation of said mandrel, a slicker adapted to be brought into contact with said blank during winding, a single means carrying said wiper and slicker and a part driven from said mandrel drive to cause successive engagement of said blank by said wiper and slicker.

10. In a device for winding paper tubes from gummed, feather-edged blanks, in combination, a mandrel having a longitudinal groove at one end thereof, a finger pivoted for movement into and out of said groove and adapted to clamp said blank to said mandrel, means to drive said mandrel intermittently, a wiper adapted to cause the edge of said blank to adhere to said mandrel after clamping by said finger and before rotation of said mandrel, a slicker adapted to be brought into contact with said blank during winding, a single means carrying said wiper and slicker and a part driven from said mandrel drive to cause successive engagement of said blank by said wiper and slicker and release of said parts in reverse order.

11. In a paper cone winding machine the combination with an intermittently rotatable mandrel, of means to clamp a suitable paper blank to the mandrel and means to wipe a marginal portion of said blank against the mandrel prior to winding the remainder of the blank on the mandrel.

12. In a paper cone winding machine the combination with an intermittently rotatable mandrel, of means to clamp a suitable paper blank to the mandrel, and means to wipe a marginal portion of said blank against the mandrel, said latter means operating while the mandrel is stationary.

13. In a cone winding machine for producing paper cones from gummed blanks the combination with an intermittently rotatable mandrel, of means for gripping a gummed paper blank upon the mandrel, a wiper and means for moving the wiper against the mandrel to press a marginal portion of the blank against the mandrel whereby said portion is gummed to the mandrel prior to winding the cone.

14. In a cone winding machine the combination with a mandrel, of means rotatable with the mandrel for gripping a gummed paper blank to the mandrel, to cause the blank to rotate therewith, said blank having a marginal portion with a feathered edge, a flexible wiper, and means for moving the same toward the mandrel to wipe said marginal portion on to the mandrel.

15. In a cone winding machine the combination with a mandrel, of means rotatable with the mandrel for gripping a gummed paper blank to the mandrel to cause the blank to rotate therewith, said blank having a marginal portion with a feathered edge, a flexible wiper, and means for moving the same toward the mandrel to wipe said marginal portion on to the mandrel, said means operating while the mandrel is stationary and before the blank is wound thereon.

16. In a cone winding machine the combination with a mandrel, of means for gripping a gummed paper blank to the mandrel, said blank having a marginal portion with a feathered edge, a flexible wiper, and means for moving the same toward the mandrel to wipe said marginal portion on to the mandrel, said wiper means operating after the blank is gripped to the mandrel and before the mandrel is rotated to wind the blank thereon, whereby said marginal portion of the blank is pasted to the mandrel before the winding operation.

17. In a machine for winding paper cones from gummed blanks the combination with an intermittently rotatable mandrel, of means for gripping the gummed blanks successively to the mandrel, a wiper mounted to rock on an axis substantially parallel to the axis of the mandrel and means for rocking the wiper into contact with the mandrel periodically to cause the inner margin of each blank to adhere to the mandrel, for the purpose set forth.

18. In a machine for winding paper cones the combination with an intermittently rotatable mandrel, of means for gripping a gummed paper blank to the mandrel, a flexible wiper movable relatively to the mandrel, means for moving the wiper into contact with the mandrel and continuing said movement until the wiper has passed the mandrel, while the mandrel is stationary, and means for returning the wiper to its initial position after the cone has been wound and ejected from the mandrel, said wiper being thus adapted to press the inner margin of the gummed blank into contact with the mandrel preparatory to the winding operation.

19. In a device for winding paper tubes, in combination, a mandrel longer than a finished tube and a mechanical device supported thereon for gripping a blank beyond the trimming line of said tube.

20. In a paper cone winding machine, in combination, a rotatable mandrel, means rotatable with the mandrel whereby a blank may be attached thereto for winding, with a marginal portion of the blank projecting beyond the point of attachment, and means for wiping the projecting marginal portion of the blank against the mandrel.

21. The combination set forth in claim 20 in which means is provided for intermittently rotating the mandrel, and means for actuating the wiping means when the mandrel is stationary.

22. The method of forming paper cones with interior deckle edges consisting in attaching the blank to a rotatable mandrel to cause the same to rotate therewith, with a marginal portion of the blank projecting beyond the point of attachment, wiping said projecting portion against the mandrel and rotating the mandrel to wind the cone.

23. In a paper cone winding machine, in combination, a rotatable mandrel, means rotatable with the mandrel whereby a blank may be attached thereto for winding, with a marginal portion of the blank projecting beyond the point of attachment, and means for effecting movement of the projecting marginal portion of the blank toward and into close contact with the surface of the mandrel.

24. The method of forming paper cones with interior deckle edges consisting in attaching the blank to a rotatable mandrel to cause the same to rotate therewith with a marginal portion of the blank projecting beyond the point of attachment, moving said projecting portion inwardly toward the mandrel to lie closely against the surface thereof, and rotating the mandrel to wind the cone.

In testimony whereof I hereunto affix my signature.

HOWARD A. EDWARDS.